No. 717,932. PATENTED JAN. 6, 1903.
C. SCUDDER.
FILTER.
APPLICATION FILED OCT. 1, 1902.
NO MODEL.
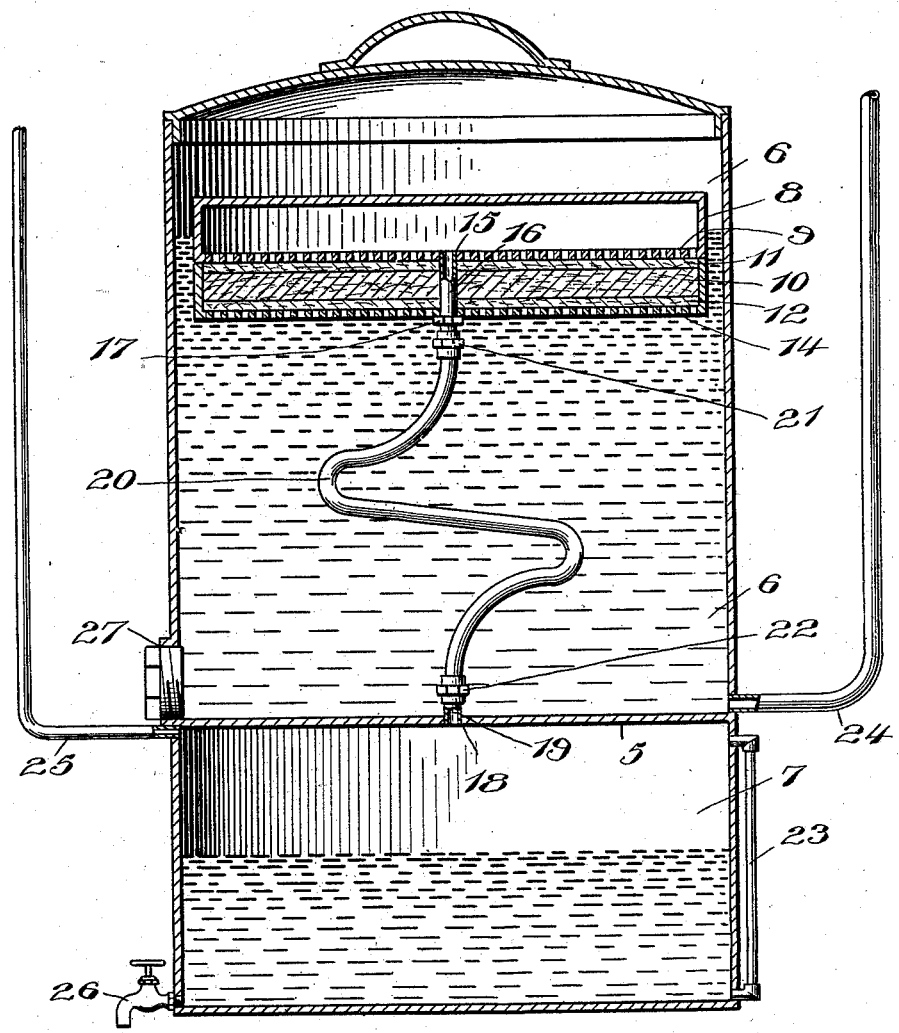
Witnesses
T. P. Britt
M. E. Lucker
Inventor
C. Scudder,
By
Attorneys

UNITED STATES PATENT OFFICE.

CHARLES SCUDDER, OF TRENTON, NEW JERSEY.

FILTER.

SPECIFICATION forming part of Letters Patent No. 717,932, dated January 6, 1903.

Application filed October 1, 1902. Serial No. 125,569. (No model.)

*To all whom it may concern:*

Be it known that I, CHARLES SCUDDER, a citizen of the United States, residing at Trenton, in the county of Mercer, State of New Jersey, have invented certain new and useful Improvements in Filters; and I do hereby declare the following to be a full, clear, and exact description of the invention, such as will enable others skilled in the art to which it appertains to make and use the same.

This invention relates to filters; and it has for its object to provide a construction wherein the liquid to be filtered is passed upwardly through the filtering-bed, so that the solid matter filtered therefrom does not cling to the filter-bed, but in most part drops to the bottom of the body of liquid, from which it may be drawn off.

A further object of the invention is to provide a construction wherein it is not necessary to force the material to be filtered through the filtering-bed by artificial pressure, the filtering-bed being movable, so that the action of the filter is continuous until the entire quantity in the filter-chamber is treated.

Other objects and advantages of the invention will be understood from the following description.

In the drawing forming a portion of this specification there is shown a vertical section of a filter embodying the present invention.

Referring now to the drawing the present filter comprises a body portion which may be cylindrical in form, as shown, and which is divided by the horizontal partition 5 to form what may be termed the "oil-chamber" 6 and the "reservoir" 7 therebelow, the oil to be filtered passing into the oil-chamber and after being filtered passing into the reservoir.

In the filter-chamber 6 is disposed what may be termed the "filter-pan," consisting of a short cylinder 8, having a central transverse partition 9 of foraminous material, the wall of the cylinder being imperforate.

In the lower portion of the cylinder 8, below the partition 9, is arranged the filter-bed, which consists of the central mat 10, having upper and lower layers 11 and 12 of filter-paper, it being understood, however, that this filter-bed may be of any suitable material or materials. To hold the filter-bed in place a foraminous cover 14 is provided for the lower end of the cylinder 8.

Centrally of the partition 9 is an enlarged opening 15, with which is engaged a pipe section or nipple 16, which is passed downwardly and through a central opening in the cover 14, and on the lower portion of this nipple is screwed a nut 17, which impinges against the bottom of the cover and holds it with the filter-bed in place.

In the partition 5 is an opening 18, with which is engaged a nipple 19, and a flexible pipe 20 has unions 21 and 22 at its ends, which are engaged with the nipples to connect the ends of the flexible pipe thereto. There is thus provided means for passage of liquid from above the partition 9 into the reservoir 7, and to indicate the height of the liquid in the reservoir a gage-glass 23 is provided therefor.

Connected with the lower portion of the filter-chamber 6 is a pipe 24, through which the liquid to be filtered is passed into the filter-chamber, said pipe 24 reaching as high as the top of the filter-chamber, so that a corresponding level of liquid may be maintained in the filter-chamber. To permit of escape of air from the reservoir as the oil enters the latter, a vent-pipe 25 is employed which leads from the upper end of the reservoir to a point above the filter-chamber, and to permit of drawing off the oil from the reservoir a spigot 26 is provided. The sediment from the bottom of the filter-chamber may be removed through the opening 27, which is provided with a suitable closure, as shown.

With this construction it will be noted that the filter pan or cylinder 8 is free to move vertically within the filter-chamber, and the cylinder with the filter-bed is adapted to float upon the surface of the liquid in the filter-chamber. The specific gravity of the filter-pan and its contents is such that the partition 9 lies slightly below the level of the liquid in the filter-chamber, so that the liquid flows upwardly through the filter-bed and into the pan above the partition 9, from which it passes through the opening 15 and thence through the nipples and the connecting flexible pipe 20 into the reservoir 7. The flexibility of the pipe 20 permits of easy movement of the filter-pan vertically in the filter-chamber, so that it rides at all times upon the surface of the oil, the weight of the pan being utilized to force the oil through the filter-bed.

It will be understood that in practice modifications of the specific construction shown may be made and that any suitable materials and proportions may be used for the various parts without departing from the spirit of the invention.

What is claimed is—

1. A filter comprising a chamber for unfiltered liquid, a filter-pan disposed in the liquid-chamber, said pan having a transverse foraminous partition, a filter-bed in the pan beneath the partition and an outlet-pipe connected with that part of the pan above the partition and having its opposite end disposed to deliver exteriorly of the liquid-chamber, the pan extending above the outlet-pipe and being hermetically sealed to buoy the pan in the liquid-chamber.

2. A filter comprising a reservoir and a filter-chamber thereabove, a filter-pan within the reservoir, said pan comprising a body portion having a transverse foraminous partition forming an upper liquid-receptacle and a lower compartment for filtering material, a foraminous cover for the lower end of the body portion of the pan, a nipple passed through the cover and the partition and communicating with the liquid-receptacle, and a pipe attached to said nipple and connected with the reservoir, said filter-pan being buoyant and adapted to float with its transverse partition below the level of the liquid in the filter-chamber, and said pipe being constructed and arranged to permit of vertical movement of the filter-pan.

In testimony whereof I affix my signature in presence of two witnesses.

CHARLES SCUDDER.

Witnesses:
 NEVIN J. LOOS,
 EDWIN COOK.